Feb. 22, 1927.                                               1,618,540
                         E. LIGONNET
              PROCESS OF COATING CEMENT PIPES
                       Filed April 15, 1924
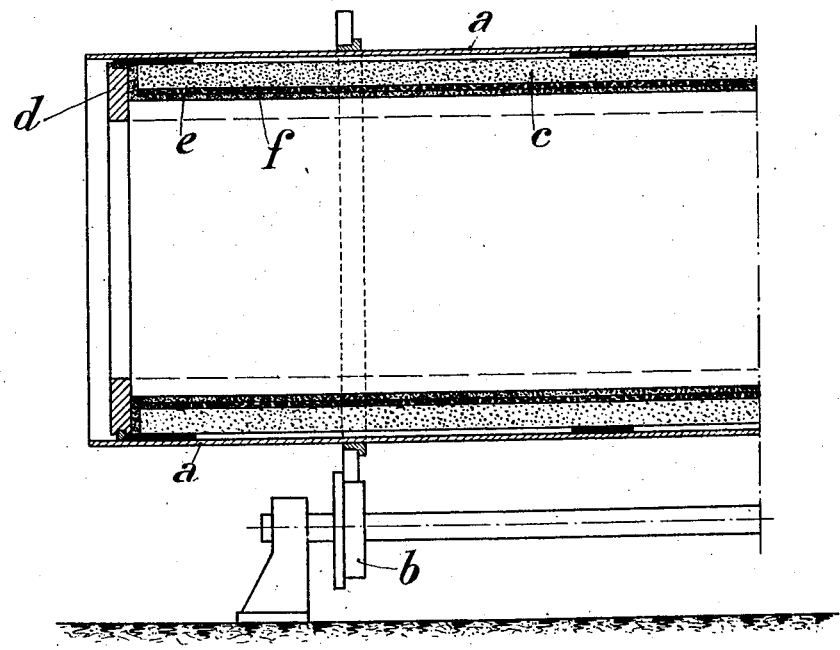
Inventor
E. Ligonnet
By Marks & Clerk
Attys.

Patented Feb. 22, 1927.

1,618,540

UNITED STATES PATENT OFFICE.

EUGÈNE LIGONNET, OF PARIS, FRANCE.

PROCESS OF COATING CEMENT PIPES.

Application filed April 15, 1924, Serial No. 706,790, and in France February 27, 1924.

My present invention relates to a process of obtaining the adherence by centrifugation of water tight coatings formed with asphalt, bitumen, asphaltic concrete, tar, pitch and the like to the inner walls and the ends of pipes and other cylindrical or conical members of cement, reinforced or not, and centrifugated or not. The process consists in forming by centrifugation inside the member to be coated a surface provided with asperities serving to cause adherence of said coatings.

The accompanying drawing illustrates diagrammatically in axial section an apparatus for performing the process.

In a suitable cylinder $a$ driven by rollers $b$ or any known means, an ordinary pipe $c$ is placed. The pipe may be formed of concrete reinforced if desired. When assembled in this manner there is introduced into said pipe a mortar the volume of which is determined by the area and thickness of the layer desired, said mortar being composed of sand, cement (more especially molten cement) and light materials such as pumice-stone, volvic, slag, coke or the like. Molten cement is a product obtained by diffusion of clay in an electrical furnace or of chalk CaO and bauxite and has the following formula:

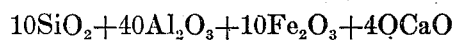

$$10SiO_2 + 40Al_2O_3 + 10Fe_2O_3 + 40CaO$$

This cement is an aluminous cement obtained by electrical treatment (see "Recherches industrielles sur les chaux, ciments et mortiers" page 157, by Bied, 1926, edited by Dunod, 92 Rue Bonaparte, Paris). Said mortar is centrifugated against the walls of the pipe which are still fresh. After centrifugation I obtain an inner wall provided with a layer of asperities $f$ formed by the light materials but covered with a fine milk of cement.

As a modification of this phase of the process, I may, after centrifugation of the pipe proper, introduce into it during rotation a load of pebbles or other dense materials having a suitable diameter and a volume determined by the area to be coated; these pebbles will cover the whole of the inner surface and will be caused to adhere by centrifugal force. For them to remain adherent after rotation ceases, a mortar of cement and sand or any suitable binder of a given volume is introduced so that said mortar will penetrate into the intervals between the centrifugated pebbles and will bind them on about half their thickness, forming also a layer $f$.

After either of the two above modes of formation of the asperities $f$, the pipe is left to dry, and when the cement has set, the surface of the inner asperities of the pipe is washed by means of a sand blast or a powerful spray of water so as to remove the milk of cement.

The pipe is then mounted on the centrifugating device leaving a space of about a quarter of an inch, limited by a ring $d$ the thickness of which is an inch or two greater than the thickness of the pipe.

The pipe is heated inside by any suitable means. As soon as the desirable temperature is obtained, I introduce a volume of hot asphalt, bitumen, pitch or other material mentioned above, which volume is determined by the surface and thickness of the coating required, then I centrifugate said material. The ends and inner walls are covered with a coating $e$ and the watertight material penetrates into the asperities of the pipe and is anchored thereto. A current of cold water is sent into the pipe and when the temperature of the latter is sufficiently low the operation is ceased. The adherence of the asphalt, bitumen, asphaltic concrete, pitch or the like is complete.

My process may also be employed with any other plastic material such as rubber, clay, etc.

What I claim is:—

1. A process of coating pipes and the like consisting in applying by centrifugation a layer of material to form asperities in said layer, heating said pipe, and applying an interior coating of bituminous material to said pipe by centrifugation while said pipe is in a heated condition.

2. An improved pipe including a cementitious body, a layer of mortar containing light divided materials applied to the inner surface of the body so as to leave a series of asperities on the inner surface, and a coating of plastic material containing a bituminous substance applied to the first layer.

In testimony whereof I hereunto affix my signature.

EUGÈNE LIGONNET.